United States Patent [19]

Breton

[11] Patent Number: 4,939,700

[45] Date of Patent: Jul. 3, 1990

[54] BATHYMETRY USING COMPUTATIONAL ALGORITHM FIELD AND BACKGROUND OF THE INVENTION

[76] Inventor: J. Raymond Breton, Three Apple Tree La., Walpole, Mass. 02081

[21] Appl. No.: 158,564

[22] Filed: Feb. 22, 1988

[51] Int. Cl.$^5$ ............................................. G01S 15/89
[52] U.S. Cl. ..................................... 367/88; 367/103
[58] Field of Search ................... 367/88, 13, 103, 105, 367/7, 11; 342/154, 157, 165, 173, 174

[56] References Cited

U.S. PATENT DOCUMENTS

| | | | |
|---|---|---|---|
| 3,144,631 | 8/1964 | Lustig et al. | 367/88 |
| 3,178,679 | 4/1965 | Wilkinson | 367/88 |
| 3,191,170 | 6/1965 | Lustig et al. | 367/88 |
| 3,296,579 | 1/1967 | Farr et al. | 367/88 |
| 3,641,484 | 2/1972 | White et al. | 367/88 |
| 3,681,747 | 8/1972 | Walsh | 367/88 |
| 4,611,313 | 9/1986 | Ziese | 367/88 |

Primary Examiner—Thomas H. Tarcza
Assistant Examiner—Daniel T. Pihulic
Attorney, Agent, or Firm—Bryan & Levitin

[57] ABSTRACT

A method and apparatus steers the returning beams of a receiver in a swath bathymetric system to an actual target based on prior steering angle information for the target and using an algorithm which demonstrates a linear relationship between the phase of the return beam and the steering angle therefor. The receiver comprises a plurality of transducing elements which each emit a signal. The array is divided into two groups of elements which are processed and combined to form beams for each group which are steered to the known steering angle for the target. Beams are then steered to a slightly offset angle to produce an offset beam. Using an equation to define each return beam according to phase and error between prior known and actual steering angles for the target, the error value can be reduced to zero to provide an accurate measurement of the actual steering angle for the target.

7 Claims, 6 Drawing Sheets

NOISELESS ERROR - 0°, 15° & 45° LOOK ANGLES

NOISY ERROR - 15° LOOK ANGLE

BATHYMETRY USING COMPUTATIONAL ALGORITHM FIELD AND BACKGROUND OF THE INVENTION

FIELD AND BACKGROUND OF THE INVENTION

The present invention relates in general to the field of bathymetry, that is the measurement of ocean depths, and in particular to a new and useful method of steering the return beam of a receiver which receives reflective energy from a target that has been illuminated by a transmitted beam of energy. The transmitted and reflected energy is generally acoustical energy and the return beam is formed by combining and processing signals from a plurality of transducing elements lying in an array. The array of transducing elements is divided into at least two groups, with the signals of each group being processed to form distinct beams for each group. Knowledge of a prior steering direction for the target is used to initially steer the beams of each group. A small offset from the known steering angle is then applied to each beam. The invention takes advantage of an observation that the phases of the beams, within certain limits, change in a linear fashion with steering angle. An error or deviation of steering angle between the actual target and the previous steering angle can thus be reduced to zero by finding the intersection of lines representing phase versus steering angle.

A method and apparatus for mapping the contours of the ocean bottom is known from U.S. Pat. No. 3,144,631 to Lustig et al. A fan-shaped beam of acoustical energy is emitted downwardly toward the ocean bottom. The fan is narrow in the travel direction of a ship carrying the mapping equipment, and is broad in a transverse direction perpendicular to the travel direction. In this way, as the ship moves over the ocean bottom, a swath of ocean bottom is ensonified. The echoed or back scattered return of acoustical energy is sensed by a receiver which comprises a plurality of individual transducing elements lying in an array which extends in the transverse direction. Signals from each transducing element are combined and processed to form return beams. Each return beam is elongated in the travel direction and narrow in the transverse direction. A plurality of these return beams are formed across the width of the illuminated strip of ocean bottom. Each return beam is steered to a different and constant steering angle so that the entire illuminated area is covered by return beams. This beamforming technique uses algorithms based on temporal detection of the output of the preformed return beams. The algorithm has been realized as analogue electronic circuits, in a computer program and as combinations of both.

The outputs of this beamforming process are passed to detection circuits which process the outputs in time to obtain best estimates of when the bottom was ensonified in each of the preformed beams. These estimates are then corrected for the refraction of water, ships motion and offset to obtain final, precise bathymetric measurements. These can be displayed to show the actual contour of the ocean bottom as it passes under a moving ship carrying the bathymetry equipment.

A contour mapping method using similar techniques is disclosed by U.S. Pat. No. 3,191,170 to Lustig et al. In this reference, the transmitting and receiving equipment is mounted on an aeroplane and is used to measure the contour of a swath of ground over which the aeroplane moves.

U.S. Pat. No. 3,641,484 to White et al discloses a technique similar to the Lustig et al patents, which however, better compensates for rolling and pitching of a vehicle carrying the mapping equipment.

U.S. Pat. No. 4,611,313 to Ziese discloses a further refinement of the swath bathymetric system which compensates for differences in refraction of sound waves through the water due to layers of water having different temperatures which lie between a ship carrying the surveying equipment and the ocean bottom.

While the foregoing patents and the present invention disclose the details of acoustic surveying and sounding equipment, it is understood that other forms of energy (e.g. radio waves) can be used while still applying the principles of the references and the present invention.

The prior art as exemplified by the foregoing references utilize algorithms which lead to inefficiencies in that they utilize preformed beams at preselected look angles. Since there is never any doubt that the ocean bottom or earth's surface is actually present, the modification of detection algorithms where there is no detection problem is inefficient. In particular, the bathymetric problem is rather to extract certain features of the return signal which characterize the bottom. An algorithm which assumes the presence of the bottom and concentrates on extracting bathymetric information, thus would prove superior to known detection methods.

SUMMARY OF THE INVENTION

The present invention utilizes swath bathymetric technique including compensation for ships motion, refraction and offsets, as disclosed in the above listed Lustig et al. and White et al. patents, but, rather than performing signal processing based on a temporal history of preformed beam outputs, utilizes a "snapshot" of data from the transducing element array. The present invention capitalizes on the fact that an imprecise estimate of the sources from the ensonified bottom is often available from previous processing. The present invention starts from these known steering angles for targets to obtain an estimate for the actual steering angle of the targets.

The transducing element array in the present invention is divided into at least two groups. Preferably the array is divided in half but other divisions can also be used. This processing of the present invention can be referred to as a split-array estimation.

The two groups of transducing element signals are then separately processed for shading (selective amplification as in the Lustig et al patents) and then are steered by beamforming to the known prior steering direction for a target. In one embodiment, the steered return beams are then again steered to two small offset steering angles from the initial estimate.

Phases of the beams are measured. It has been found that the phases of the beams are very nearly linearly related to the pointing or steering angle of the beams. By using two sets of transmitting element signals to produce two sets of beams, lines corresponding to phase versus steering angle can be calculated. The intersection of these lines can be taken as an accurate estimate of the true bearing of the target.

In another embodiment, the phases of the initial two beams can be used directly to produce a final estimate of the true bearing.

The process is then repeated for each separate target, based on prior known steering angles for each target.

Corrections for refraction, ship's motion and the like, as in the prior art, can then be made.

By forming more than one estimate, the split-array estimation can produce an error vector which represents the error between the prior known steering angle for the target and the current unknown and actual steering angle for the target. This error vector is used also as a figure of merit for the processing of a whole. Appropriate strategies can then be used if the algorithm of the present invention fails.

The algorithm of the present invention, which will be defined mathematically below, has been simulated for a large array of transducing elements in the presence of varying amounts of random phase noise. These simulations have shown that the algorithm has excellent resistance to noise.

Other advantages of the invention are high accuracy, high data density, maximum lateral coverage, insensitivity to amplitude fluctuations, computational efficiency, stability, the use of non-recursive techniques of the prior art, self evaluation, and the fact that the system works in high to moderate signal-to-noise ratio environments.

The present invention can reduce initial uncertainty for the steering direction of beams from one degree bearing errors by a factor of almost 1,000, to an error which is reduced to about 0.001°.

The data rate for the split-array estimation corresponds to the number of "snapshots" that can be taken for previously known targets. This number is far greater than the number of beams which was the resolution of prior art swath bathymetric techniques as disclosed in the above-identified patents.

Also, since split-array estimation does not depend on fixed preform beams, it can process laterally incoming signals to the limit of detectability. This means that swath width depends not on pre-established selection of steering angles for the return beams, but only on signal strength. As long as the signals are strong enough from lateral directions, a return beam can be steered sideways at rather steep angles.

The fact that in accordance with the present invention, estimation is driven by phase output from the beam former and not amplitude output, errors of amplitude which do not effect phase do not effect the results of the estimation.

The split-array estimation computes only those beams for which prior steering direction information is available. This information indicates the possibility of a return and this direction is used as an initial steering direction for beamforming. This contrasts with the prior art in which many beams are continually formed at set angles. The split-array estimation is conducted without tracking or recursion. Either a highly accurate estimate is produced or a large error is formed. If a large error is formed, this indicates the failure of the algorithm and the danger of limit cycling is avoided.

Accordingly, an object of the present invention is to provide a method of steering a return beam of a receiver, to a target, the receiver receiving reflected energy from the target which has been illuminated by a transmitted beam of energy which is narrow in a first direction and wide in a second direction, the return beam being wide in the first direction and narrow in the second direction, the receiver having a plurality of transmitting elements lying in an array extending in the second direction, and wherein a prior steering angle for the target is known, the method comprising: dividing the array into at least two parts for producing at least two groups of transducing element signals; combining and processing the signals of each group to steer each group to the known prior steering angle to form an initial beam for each group; measuring the phase of the initial beam for each group; combining and steering the signals of each group to steer each group by a known offset angle from the known prior steering angle to form an offset beam for each group; measuring the phase of the offset beam for each group; phase of the initial and offset beams changing in a linear fashion with an error difference between an actual steering angle from the target and the known prior steering angle for the target; and finding an intersection of lines plotting phase versus the error difference to find the phase at which the error difference is zero which represents an estimate of the actual steering angle for the target.

A further object of the invention is to provide an apparatus for performing the method.

A still further object of the present invention is to provide a method and apparatus which efficiently, quickly and accurately estimates the actual steering angle for targets on which prior steering angle information is available.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
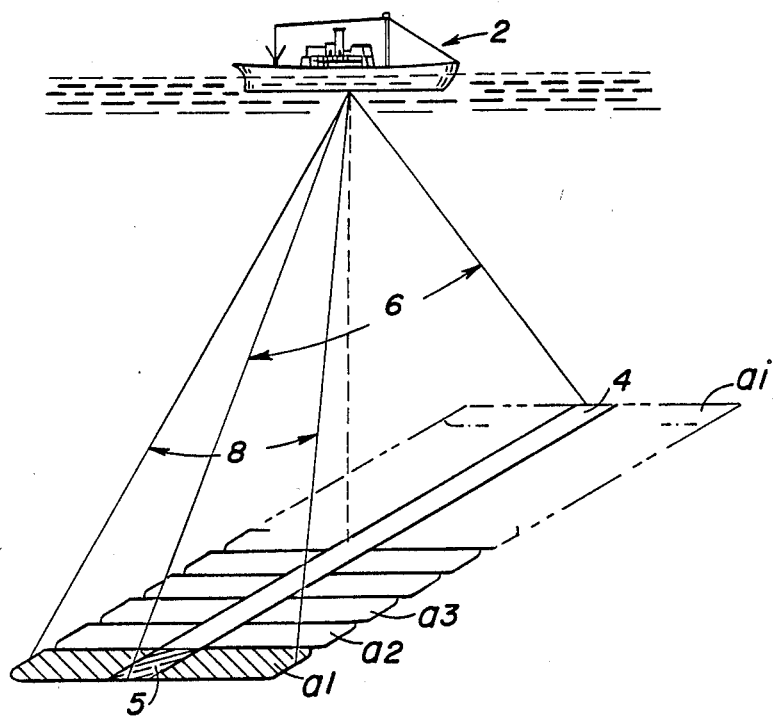
FIG. 1 is a diagramatical perspective view of a ship on the ocean carrying a swath bathymetric system which emits and receives beams of energy for mapping a swath of ocean floor.
Figure 2:
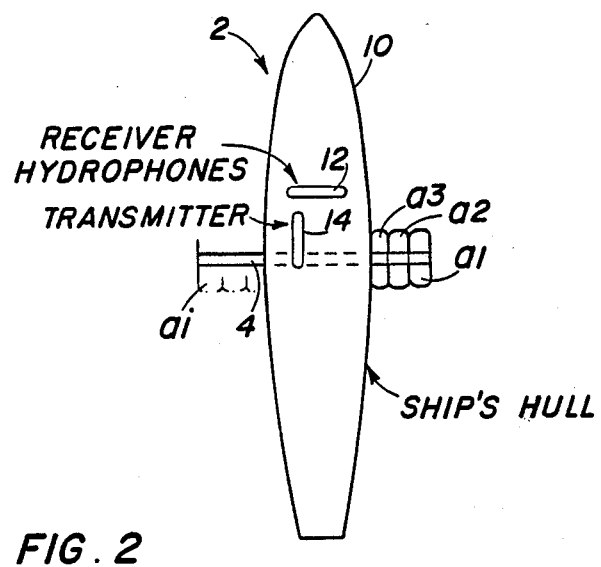
FIG. 2 is a schematic top plan view illustrating a typical location for transmitting and receiving equipment on the hull of the ship shown in FIG. 1, as well as the pattern of transmitted and returned beams.

Referring to the drawings in particular, the invention embodied in FIGS. 1 and 2 comprises a method and apparatus which is particularly for use with swath bathymetry systems carried by a ship 2 riding on the surface of the ocean, for mapping or sensing a swath of ocean floor which is illuminated by an elongated area of illumination 4.

The illuminated area 4 is illuminated by a fan shaped beam of acoustical energy 6 which is emitted from a transmitter mounted on the hull of ship 2. Fan 6 is shaped so that illuminated area 4 is narrow in a first travel direction of ship 2, and wide in a second transverse direction of ship 2.

Sound energy which is reflected from the illuminated area 4 is picked up by an array of receiving elements. By signal processing the array of receiving elements are steered to selected looking angles. This forms return beams which overlap the illuminated area 4. One return beam 8 is shown in FIG. 1. It overlaps target area 5 of illuminated area 4.

In accordance with the present invention, only targets on which previous steering angle information is known are covered by return beams. As a practical matter however, this can cover the entire illuminated area 4 since presumably the entire area has knolls and valleys which together form the contour of the ocean bottom. The areas a1, a2, a3 ... ai, show areas of successive return beams for successive targets which can all be processed in accordance with the present invention to obtain information on the contour of the ocean bottom.

As shown in FIG. 2, the illuminated area 4 is illuminated by a transmitter 14 which is actually in the form of plural individual transmitting elements which lie in an array extending in the first or travel direction for ship 2. The receiver 12 is in the form of plural receiving transducers or hydrophones which extend in the second or transverse direction.

Details on how signals from the transmitter and receiver are processed for shading (multiplying or amplification) and steering (to selected known angles) can be found in the above-identified Lustig et al patents. U.S. Pat. No. 3,144,631 to Lustig et al is incorporated here by reference.

Figure 3:
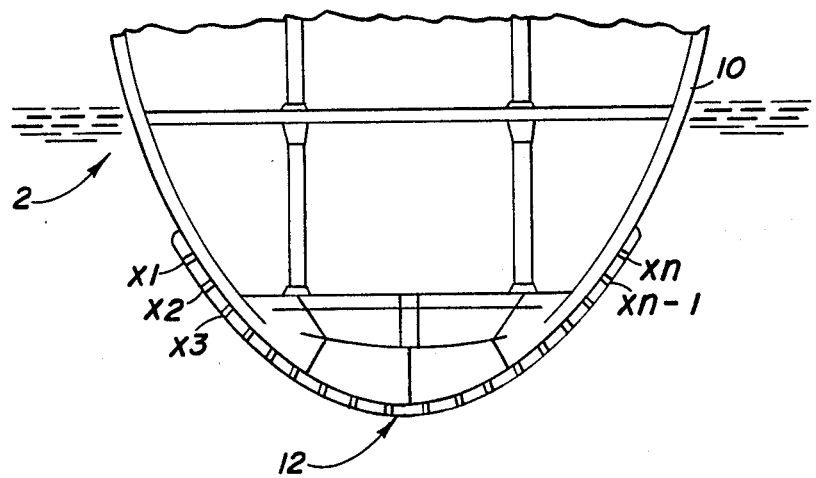
FIG. 3 is a cross section of part of the ship's hull, showing the array of receiving elements.

FIG. 3 shows an array of receiving elements x1, x2, x3 ... xn, which are fastened to the hull 10 of ship 2. Known signal processing is used for treating the signals from each element or transducer x1 through xn so that in effect the signals are projected onto a common reference plane or line. This avoids any inaccuracies of the contour estimates which would be introduced by the fact that the transducers lie on a curved path along the bottom of the hull 10.

Figure 4:
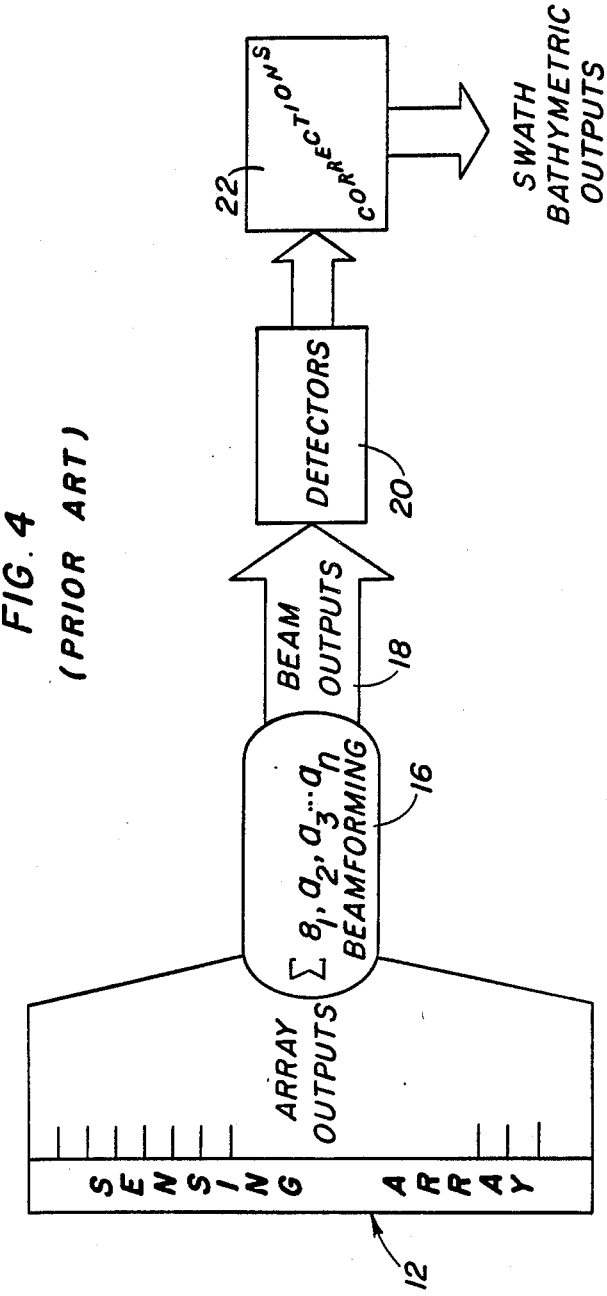
FIG. 4 is a block diagram showing the prior art apparatus for swath bathymetry.

FIG. 4 shows the prior art swath bathymetry system which connects the outputs of each transducer from receiver 12 to beam forming equipment 16 which amplifies (shades) and steers (by selective time delays) beams to form return beams at selected known angles. These beams produce outputs 18 which are processed in detectors 20 to provide rough estimates of the ocean floor contour. These are refined by correction equipment 22, which corrects the estimates for variables such as refraction, ship's speed, rolling and pitching of the ship, and the like. Swath bathymetric outputs are provided from equipment 22 which can be supplied to displays such as CRTs, chart recorders, computer data collecting equipment, etc.

Figure 5:
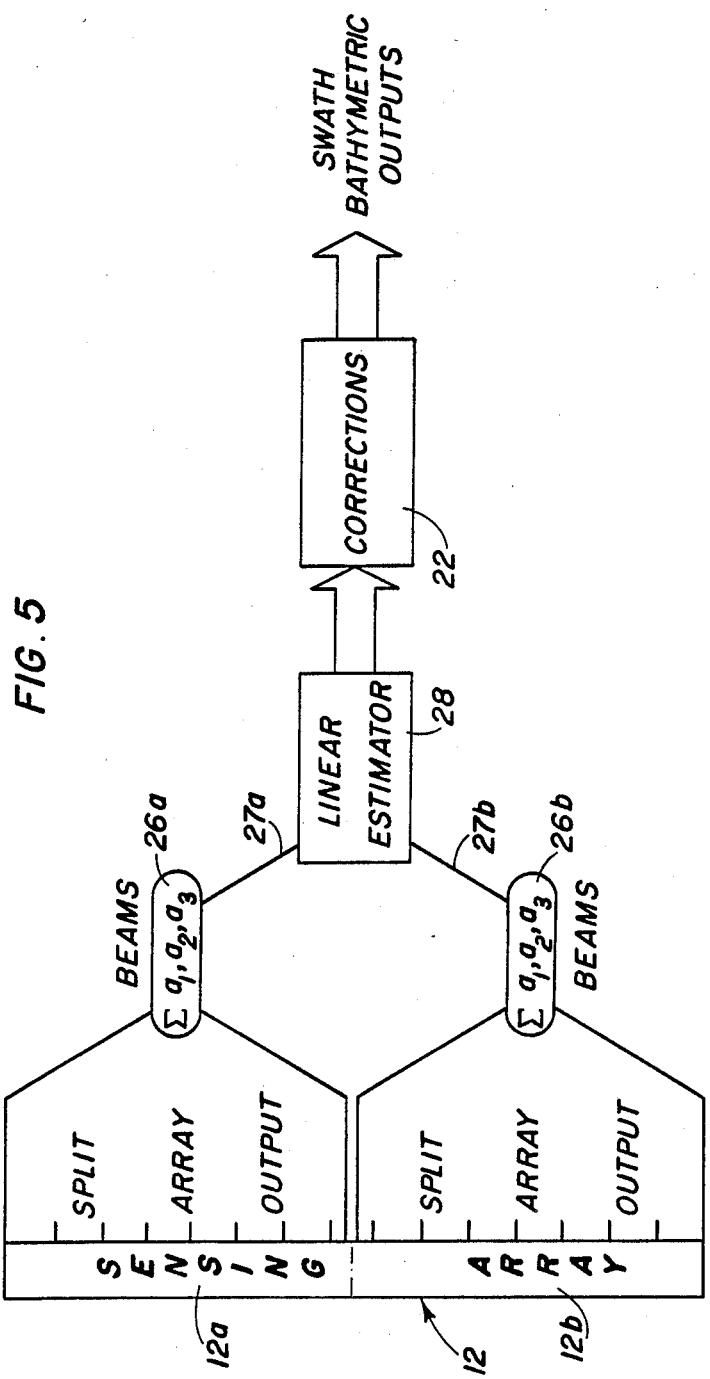
FIG. 5 is a block diagram showing an apparatus in accordance with the present invention for split-array estimation.

FIG. 5 illustrates an apparatus used in accordance with the present invention.

As in the prior art, a plurality of receiving elements are assembled as a sensing array or receiver 12. In accordance with the present invention, they are divided either in half or some other ratio, into two groups of sensing elements 12a and 12b. The signals or split-array outputs of the two groups of elements are supplied respectively to beamforming equipment 26a and 26b which individually combine and process signals from transducers in their own group. Return beam output 27a and 27b are then formed which include phase and steering angle information. These outputs are supplied to a linear estimator 28 which estimates an error value between a prior known steering angle for a target and an actual steering angle for the same target.

The linear estimator provides outputs corresponding to outputs of the detector of the prior art, which are then corrected in correction equipment 22 and provided as swath bathymetric outputs for further processing.

The present invention is based on the observation that within limits, the phases of return beams are very nearly linear to their pointing error between a prior steering angle for a particular target and a current actual steering angle for that target. A very accurate estimate of the true bearing of the target can thus be generated from a simple intersection of the lines of phase versus steering angle. Two lines can be formed using the two groups of receiving elements 12a and 12b, and the two beam formers 26a and 26b.

To mathematically demonstrate the present invention, assume that a "snapshot" of data from the n elements of the sensing array or receiver 12 can be described by a vector r, made up of complex arguments. First the vector r is divided into two or more parts shown at 12a and 12b in FIG. 5. The amplitude of each group of signals of r is then shaded (multiplied) according to the prior art (see Lustig et al U.S. Pat. No. 3,144,631). As is known, this does not effect the pointing ability of subsequent beamforming.

Now suppose that r contains, among other responses, the response from a bottom ensonified target or source, at angle a. The vector r can then be written;

$$r(x) = ro + A \exp[ju] \exp[-jkx \sin(a)] \quad (1)$$

In equation (1) ro is a residual value, A is the amplitude, u is the phase of the received beam which has reflected or ensonified energy from a target at an actual steering direction or angle a. The parameter x is a position parameter for each of the receiving elements of the array group.

From prior processing, it is known that the ensonification of the target which is actually at steering direction or angle a, comes roughly from a prior known direction ap. The prior known steering direction or angle ap can be thought of as the actual angle a plus an error amount e. Thus:

$$ap = a + e \quad (2)$$

As a result of beam forming in the direction ap, a beam for the prior known direction can be calculated as follows:

$$B(ap) = \sum_x ro(x) \exp[jkx \sin(a + e)] + \quad (3)$$

$$\sum_x A \exp[ju] \exp[jkx (\sin(a + e) - \sin(a))]$$

Equation (3) can be written by the following approximation:

$$B(ap) \simeq \sum_x ro(x) \exp[jkx \sin(a + e)] + \quad (4)$$

$$A \exp[ju] \sum_x \exp[jkxe \cos(a)]$$

The first term on the right hand portion of approximation (4) is of little consequence since it concerns a side-lobe response which is outside of the band of the return beam. The second term however, shows the quasi-linear phase relationship between phase u and steering error e. In equations (3) and (4), k is the wave number and j is the complex number (square root of minus one).

As demonstrated by equation (4), there will exist a region around the true direction a in which deviations from the direction a are linear with the phase of the beamformers output B.

The foregoing mathematical algorithm can be repeated for one or more similar deviations. By measuring phase for the beamformers outputs B, and by steering the return beams to known selected offsets or steps away from the prior known direction ap, linear estimates can be obtained. Only two such estimates are required to determine an intersection where the error e is equal to zero. Thus, a highly refined estimate of the target bearing a is obtainable.

Accordingly, the present invention represents not only a modified tracking algorithm but also utilizes a novel convergence method. The estimation utilizes pre-existing knowledge concerning the bearing of targets which are inexact with regard to the current bearing for the targets. It seeks to refine that knowledge into a very accurate estimation of the current target bearings. Rather than using recursive methods of the prior art, the present invention zooms in on the answer quickly. The algorithm produces, in addition, a quantitative measure of its success (by calculating the error values).

The data that the algorithm requires is already available from swath bathymetric systems such as those disclosed by the Lustig et al patents. From these systems, a set of simultaneous samples from a hydrophone array are available. This information is sufficient to produce two tracking beams directed in the prior known direction or look angle, and also at small offsets from that angle. Assuming that the prior known information is sufficiently accurate, the true look angle is linearally related to the phases of the tracking beams. Thus, the angle at which the phase would be zero is estimated and asserted as an accurate estimate of the look angle.

By using more than one split tracking beam, the estimation also produces error estimates of its process. This capacity is lacking in prior art systems.

The accuracy and resistance to noise of the present invention has been demonstrated by computer simulation.

To measure the errors of the algorithm used by the present invention, it is assumed that all errors contributing a system bias have been removed and that the residual error is expressed as a random variable in the phase of each hydrophone. The amplitude error for the split-array estimation is not relevant except as it may effect phase error.

The approach of the computer simulation is both empirical and analytical. Two very different types of error contribute in different ways to the final results. The first type produces a bias and results from the dislocation in pointing angle due to the variation from ideal input. This type of error is extrinsic to the algorithm. The second type of error is intrinsic to the algorithm. TABLE 1 illustrates the first type of error. The magnitude of this error can be magnified by reducing the interval, known as "step" between an initial beam and an offset beam.

The step (in degrees) is given at the right most column of the table. By closing the step to 0.1°, it can be seen that the estimation is actually pointing at 14.9959, rather than at 15° exactly. The difference in these two numbers is 0.0041°, representing the error from an interfering target, this error is neglible and is ignored.

TABLE 1 also shows how a larger step size of ±0.5° has induced an intrinsic error of 0.002° between the estimated target angle for step size 0.5 and step size 0.1. This is the second type of error.

A good idea of the error can be obtained by investigating three representative look angles; 0°, 15° and 45°.

Figure 6:
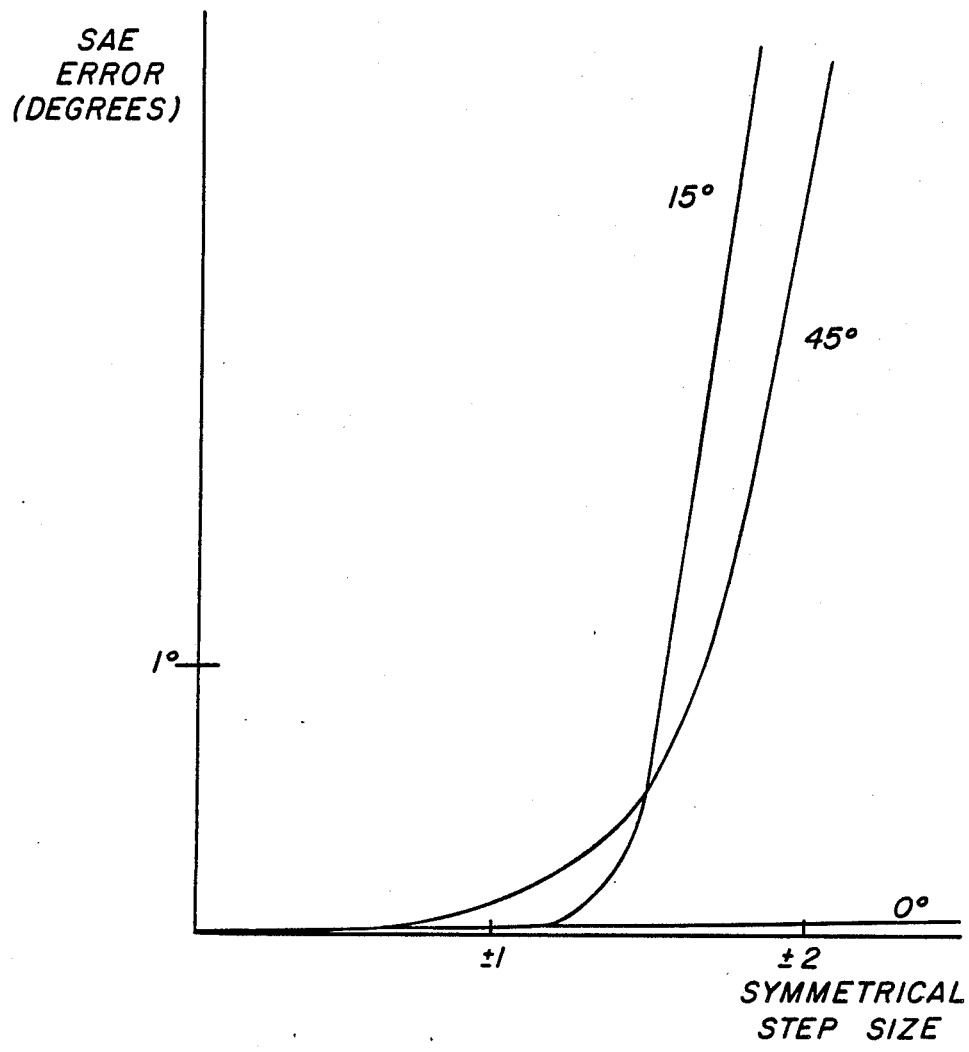
FIG. 6 is a graph plotting split-array error versus step or offset size between the initial and the offset return beams formed in accordance with the present invention.

Assuming a noiseless condition, FIG. 6 shows the split-array estimation (SAE) error plotted against look angles of 0°, 15° and 45°. FIG. 6 gives the errors as a function of symmetrical step size that is the right and left split-array beams are pointing to the true look angle ± the step angle. Within its region of validity this should produce no difference in the split-array estimation error.

To determine how noise would effect the present invention, noise was added for the case of various look angles. Phase noise at 0°, 10°, 30°, 60° and 90° was utilized.

Figure 7:
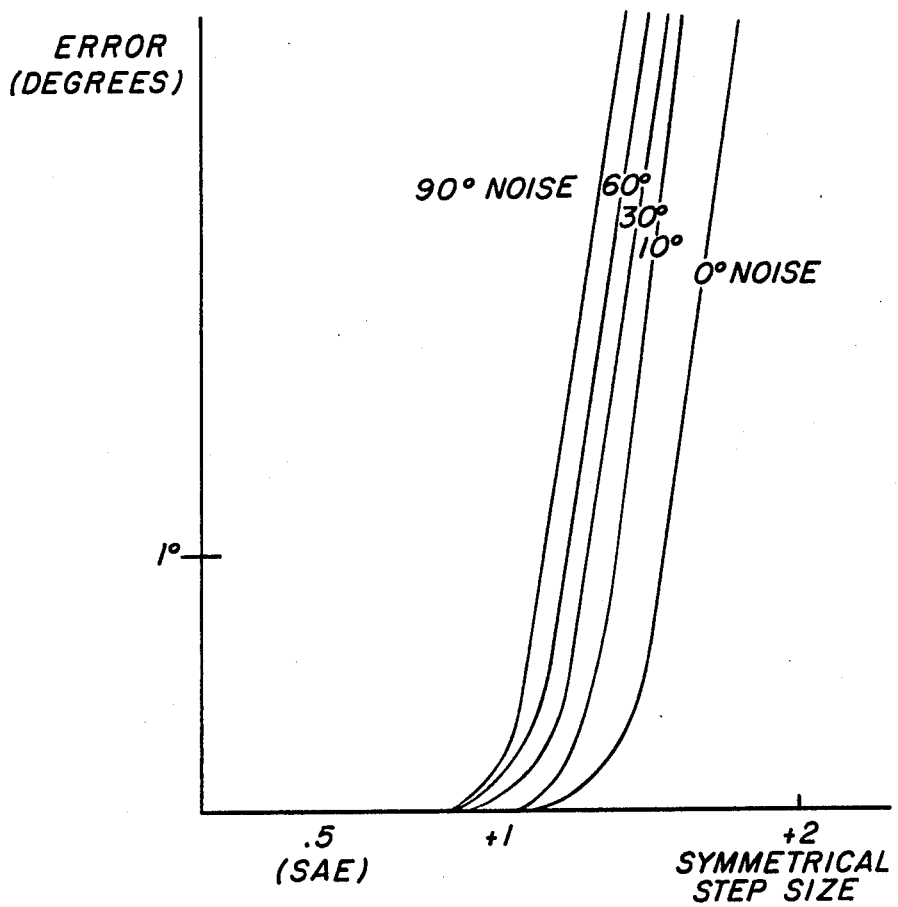
FIG. 7 is a graph plotting error against symmetrical step or offset size, illustrating the effect of noise.

FIG. 7 shows the case for a 15° look angle for these five phase noise values.

Calculations show that the split-array estimation gives good results. For the noiseless case at ±0.5°, the intrinsic error was 0.006°. For 90° phase noise, the intrinsic error was raised only to 0.002°.

The latter error is the error which can be attributed to the split-array exclusively.

It was found that the errors introduced by the present invention were actually smaller than the computational accuracy of the analysis software which used single precision According to the present invention by starting with a rough knowledge of the bottom ensonification, a thousand fold improvement in aiming accuracy can be achieved.

TABLE 1

| PHASE | SAE ERROR ANGLE (Degrees) | | STEP |
|---|---|---|---|
| LP1 69.9969 | 14.55 | | .5 |
| RP1 −27.3844 | 14.55 | | .5 |
| LP2 −37.2325 | 15.55 | | .5 |
| RP2 82.8969 | 15.55 | | .5 |
| ESTIMATE SOURCE ANGLE IS: | 14.9977 | TRUE SOURCE ANGLE IS: | 15 |
| LP1 54.0502 | 14.6977 | | .3 |
| RP1 −10.9892 | 14.6977 | | .3 |
| LP2 −10.3406 | 15.2977 | | .3 |

TABLE 1-continued

| PHASE | | SAE ERROR ANGLE (Degrees) | | STEP |
|---|---|---|---|---|
| RP2 | 55.2318 | 15.2977 | | .3 |
| ESTIMATE SOURCE ANGLE IS: | | 14.9955 | TRUE SOURCE ANGLE IS: | 15 |
| LP1 | 32.6527 | 14.8965 | | .1 |
| RP1 | 11.0134 | 14.8965 | | .1 |
| LP2 | 11.1889 | 15.0965 | | .1 |
| RP2 | 33.0872 | 15.0965 | | .1 |
| ESTIMATE SOURCE ANGLE IS: | | 14.9959 | TRUE SOURCE ANGLE IS: | 15 |

While a specific embodiment of the invention has been showed and described in detail to illustrate the application of the principals of the invention, it will be understood that the invention may be embodied otherwise without departing from such principals.

The invention claimed is:

1. In a method of steering a return beam of receiver, to a target, the receiver receiving reflected energy from the target which has been illuminated by a transmitted beam of energy which is narrower in a first direction than in a second direction, the return beam being wider in the first direction than in the second direction, the receiver having a plurality of transmitting elements lying in an array extending in the second direction, and wherein a prior steering angle for the target is known, the improvement comprising a method of estimating the actual steering angle for the target comprising:

dividing the array into at least two parts for producing two groups of transducing element signals;

combining and processing the signals of each group to steer each group to the known prior steering angle to form an initial beam for each group;

measuring the phase of the initial beam for each group;

combining and processing the signal of each group to steer each group by a known offset angle from the known prior steering angle to form an offset beam for each group;

the phase of the initial and offset beams changing in a linear fashion with an error difference between an actual steering angle from the target and the known prior steering angle for the target; and finding an intersection of lines formed by plotting phase versus the error difference to find the phase at which the error difference is zero which represents an estimate of the actual steering angle for the target.

2. A method according to claim 1 wherein said offset angle is no greater than 0.5°.

3. A method according to claim 1 wherein the initial beam B (ap) for the known steering angle ap, is calculated using the equation:

$$B(ap) = A\exp[ju] \sum_x \exp[jkxe \cos(a)]$$

wherein A is the amplitude of the transducing element signals, j is the complex number, u is the phase, k is the wave number, x is a position parameter for each receiving element, e is the offset beam angle and a is the actual target steering angle.

4. A method according to claim 1 wherein said array is divided in half.

5. A method according to claim 1 including steering and processing the signals of each group to steer each group by the known offset angle from the known prior steering angle to form a second offset beam on an opposite side of said initial beam from said first mentioned offset beam, for each group.

6. An apparatus for steering a return beam for a receiver to a target, the receiver receiving reflected energy from the target which is illuminated by a transmitted beam of energy which is narrower in a first direction than in a second direction, the return beam being wider in the first direction than in the second direction, and wherein a prior steering angle for the target is known, comprising:

the receiver having a plurality of transducing elements lying in an array extending in the second direction, said array being divided into two groups of transducing elements each for generating a signal;

first beamforming means connected to said transducing elements of one group for receiving signals therefrom;

second beamforming means connected to said transducing elements of the other group for receiving signals therefrom; and linear estimator means connected to said first and second beamforming means for estimating an error between the prior known steering angle and an actual steering angle for the target;

each of said first and second beamforming means comprising means for combining and processing the signals of one group of said transducing elements to steer said group to said prior known steering angle to form an initial beam, means for measuring the phase of the initial beam, means for combining and processing the signals of the group to steer the group by a known offset angle from the known steering angle to form an offset beam, and means for measuring the phase of the offset beam.

7. An apparatus according to claim 6 wherein said linear estimator means is for forming at least two lines corresponding to phase versus steering angle for said beamforming means and for locating an intersection of said lines at a phase equals zero location corresponding to the actual steering angle for the target.

* * * * *

UNITED STATES PATENT AND TRADEMARK OFFICE
CERTIFICATE OF CORRECTION

PATENT NO. : 4,939,700

DATED : July 3, 1990

INVENTOR(S) : J. Raymond Breton

It is certified that error appears in the above-identified patent and that said Letters Patent is hereby corrected as shown below:

ON THE TITLE PAGE:

The title should be corrected to read:

BATHYMETRY USING COMPUTATIONAL ALGORITHM FIELD

In "Description of the Preferred Embodiment", column 8, line 49 insert "calculations." after the word "precision"

Signed and Sealed this

Twenty-second Day of October, 1991

*Attest:*

HARRY F. MANBECK, JR.

*Attesting Officer*    *Commissioner of Patents and Trademarks*